US012510198B2

(12) United States Patent
Durieux

(10) Patent No.: US 12,510,198 B2
(45) Date of Patent: Dec. 30, 2025

(54) COUPLING ELEMENT AND PROCESS FOR MANUFACTURING SUCH A COUPLING ELEMENT

(71) Applicant: STAUBLI FAVERGES, Faverges-Seythenex (FR)

(72) Inventor: Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 18/784,714

(22) Filed: Jul. 25, 2024

(65) Prior Publication Data
US 2025/0035244 A1    Jan. 30, 2025

(30) Foreign Application Priority Data

Jul. 27, 2023 (FR) ........................... 2308107

(51) Int. Cl.
*F16L 37/22* (2006.01)
*F16L 37/18* (2006.01)
*F16L 37/20* (2006.01)

(52) U.S. Cl.
CPC ............... *F16L 37/22* (2013.01); *F16L 37/18* (2013.01); *F16L 37/20* (2013.01)

(58) Field of Classification Search
CPC ............ F16L 37/20; F16L 37/18; F16L 37/22
See application file for complete search history.

(56) References Cited

U.S. PATENT DOCUMENTS

| | | | |
|---|---|---|---|
| 2,191,579 A | 2/1940 | Nelson | |
| 3,167,335 A | 1/1965 | Maisch | |
| 6,035,894 A * | 3/2000 | Weh | |
| 10,865,925 B2 * | 12/2020 | Kuo | |
| 2012/0086202 A1 * | 4/2012 | Tiberghien | |
| 2014/0145430 A1 * | 5/2014 | Tiberghien | |
| 2015/0233509 A1 * | 8/2015 | Tiberghien | |
| 2019/0333420 A1 * | 10/2019 | Danielson | F16L 37/20 |
| 2020/0363000 A1 * | 11/2020 | Tiberghien | F16L 37/22 |

FOREIGN PATENT DOCUMENTS

| | | |
|---|---|---|
| FR | 2425605 A1 | 12/1979 |
| WO | WO-2012166546 A2 | 12/2012 |

OTHER PUBLICATIONS

French Application No. 2308107, Preliminary Search Report, Issued Jan. 11, 2024.

* cited by examiner

*Primary Examiner* — William S. Choi
(74) *Attorney, Agent, or Firm* — MARSHALL, GERSTEIN & BORUN LLP

(57) ABSTRACT

A coupling element comprising a cannula, a body and at least one first jaw movable in rotation about a first axis of rotation. In a clamping position, the first jaw presses a hose against the cannula in a zone defined by a boundary plane spaced from the first axis of rotation by a first distance. The coupling element further comprises a movable pusher having a first bearing surface configured to exert a movement force on a force-receiving surface of the first jaw. When the first jaw is in the clamping position thereof, a first radial gap between the first axis of rotation and a contact point of the force-receiving surface and of the first bearing surface has a value greater than the value of the first distance.

15 Claims, 10 Drawing Sheets

COUPLING ELEMENT AND PROCESS FOR MANUFACTURING SUCH A COUPLING ELEMENT

FIELD

The present invention relates to a coupling element for connecting a fluid pipe to a hose. The present invention further relates to a method for manufacturing such a coupling element.

BACKGROUND

A known technique for connecting a fluid pipe to a hose is to make a cannula to penetrate into the hose by elastic deformation of the hose. The cannula defines a longitudinal passage that is connected to the pipe.

U.S. Pat. No. 3,167,335A discloses a coupling member wherein a cannula is arranged in a body equipped with means for pressurizing a hose. The pressurizing means can be cut off during a connection and a disconnection of the hose to the cannula. The pressurizing means consist of a jaw articulated about a perpendicular axis and distant from a longitudinal axis of the cannula. The jaw is movable between a clamping position, where same presses the hose against the cannula, and a retracted position, where same is a distance from the hose. A spring returns the jaw toward the clamping position thereof. A lever, secured to the jaw and accessible from outside the body, allows an operator to bring the jaw into the retracted position thereof. The equipment does not provide a means to ensure a safe and effective holding of the hose on the cannula, in particular when the pressure of the fluid circulating between the conduit and the cannula is high. One solution for increasing the elastic clamping of the hose on the cannula consists in providing an outer diameter of the cannula much greater than the inner diameter of the hose, but thereof makes it more difficult to connect and disconnect the hose and the cannula.

SUMMARY

It is such drawbacks that the invention seeks more particularly to remedy by proposing a novel coupling element for the quick connection of a fluid pipe and a hose, wherein a jaw articulated on the body of the coupling element can be effectively held in the clamping position of the hose against a cannula.

To this end, the subject matter of the invention is a coupling element for the connection of a fluid pipe to a hose, the coupling element comprising a cannula defining a passage for fluid and extending along a longitudinal axis of the coupling element between a front portion configured to fit onto the hose and a rear portion intended to be coupled to the fluid pipe, a body extending along the longitudinal axis about the cannula and secured thereto and defining an access mouth to the front portion of the cannula; at least a first jaw movable in rotation about a first axis of rotation perpendicular to and offset from the longitudinal axis between:
- a clamping position wherein the first jaw presses the hose against the front part of the cannula in an inclusive zone comprised, radially to the longitudinal axis between the longitudinal axis and the first axis of rotation and bounded along the longitudinal axis by a boundary plane, perpendicular to the longitudinal axis and spaced from the first axis of rotation by a first distance, measured parallel to the longitudinal axis, which is non-zero;
- a retracted position wherein the first jaw does not press the hose against the front part of the cannula; and
- a maneuvering member, accessible from outside the body, for moving the first jaw between the clamping position thereof and the retracted position thereof.

According to the invention, the coupling element comprises:
- a pusher, housed in an internal volume of the body around the cannula and movable, in translation along the longitudinal axis, relative to the body;
- a member for elastic return of the pusher towards a forward position;
- the pusher is provided with a first surface bearing against the first jaw;
- the first bearing surface of the pusher is configured to exert on the first jaw a force for moving the first jaw from the retracted position thereof to the clamping position thereof;
- the first bearing surface is arranged, with respect to the longitudinal axis, opposite the first axis of rotation;
- when the first jaw is in the clamping position thereof, with the first bearing surface against the first jaw, a first radial gap, measured perpendicular to the longitudinal axis, between the first axis of rotation and a contact point of the force-receiving surface of the first jaw and the first bearing surface having a value greater than the value of the first distance.

By means of the invention, the first radial gap allows the pusher to transmit to the first jaw a force received from the elastic return member, with a lever arm greater than the lever arm of the resisting force exerted by the hose on the jaw. In other words, the geometry of the constituent elements of the coupling element ensures an effective application of the forces, which makes the tightening of the hose on the cannula reliable. It is thereby possible for the first jaw to effectively resist a separation force between the cannula and the hose, in particular when the pressure of the fluid passing through the cannula and the hose is high.

According to advantageous but non-mandatory aspects of the invention, such a coupling element can incorporate one or a plurality of the following features, taken individually or according to any technically permissible combination.
- the member for elastically returning the pusher to the advanced position thereof, is also a member for returning the first jaw to the clamping position thereof.
- a ratio between the value of the first radial and the value of the first distance is comprised between 1.5 and 10, preferably between 4 and 6, and more preferably equal to 5.
- the coupling element further comprises a second jaw, movable in rotation, about a second axis of rotation, perpendicular to, and offset from, the longitudinal axis, between a clamping position wherein the second jaw presses the hose against the front part of the cannula in a zone comprised, radially to the longitudinal axis between the longitudinal axis and the second axis of rotation and bounded along the longitudinal axis by a boundary plane, perpendicular to the longitudinal axis and spaced from the first axis of rotation by a second distance, measured parallel to the longitudinal axis, which is non-zero; and
- a retracted position wherein the second jaw does not press the hose against the front part of the cannula;
- the pusher comprising a second surface bearing against the second jaw, the second bearing surface of the pusher being configured to exert on the second jaw a force to move the second jaw from the retracted position thereof to the clamping position thereof, the second bearing surface is arranged opposite the second axis of rotation in relation to the longitudinal axis and, when the second jaw is in the clamping position thereof, with the second bearing surface against the second jaw, a second radial gap measured perpendicular to the longitudinal axis, between the second axis of rotation and a point of contact of the force receiving surface of the second jaw and the second bearing surface having a value greater than the value of the second distance.

A ratio between the value of the second radial gap and the value of the first distance D10 is comprised between 1.5 and 10, preferably between 4 and 6, and more preferably equal to 5. The values of the first and second distances are equal and the values of the first and second radial gaps are equal.

The pusher comprises a relief configured to exert on the second jaw a force for moving the second jaw from the clamping position thereof to the retracted position thereof.

The maneuvering member of the first jaw is a lever secured to the first jaw.

The maneuvering member of the first jaw is a ring that can move axially, along the longitudinal axis, in relation to the body.

According to another aspect, the invention relates to a method for manufacturing a coupling element as mentioned hereinabove, more particularly a method wherein:
  the body is provided with at least one inner radial guiding surface;
  the pusher is provided with at least one outer radial guiding surface configured to engage the inner radial guiding surface to guide the pusher during the movements thereof along the longitudinal axis;
  the pusher is movable within the passage of the body, up to a reference position, wherein the or each outer radial guiding surface of the pusher is disengaged from any inner radial guiding surface of the body and vice versa;
  the method comprises a step a) consisting in simultaneously producing, by additive manufacturing, the body and the pusher, while the pusher is in the reference position thereof.

Advantageously, such method comprises successive steps subsequent to step a) and consisting in:
  b) moving the pusher in the body of the coupling element to a position where the radial outer guiding surfaces are engaged with the radial inner guiding surfaces;
  c) pre-positioning the two jaws in a housing;
  d) engaging the housing equipped with the jaws in the body, through an opening provided in the body;
  e) fitting and screwing tightening screws in bearings of the housing and in tapped orifices of jaws 10 and 12, respectively, in such a way that the screws are aligned with the first axis of rotation and with the second axis of rotation;
  f) mounting the member for elastically returning the spring of the pusher in the internal volume of the body, bearing against the pusher; and
  g) fitting the cannula inside the pusher and the body, bringing the elastic return member to bear against the cannula.

BRIEF DESCRIPTION OF THE DRAWINGS

The invention will be better understood and other advantages thereof will appear more clearly in the light of the following description of a plurality embodiments of a quick-coupling element according to the principle thereof and to the manufacturing method thereof, given only as an example and made with reference to the enclosed wherein.

DESCRIPTION

Figure 1:
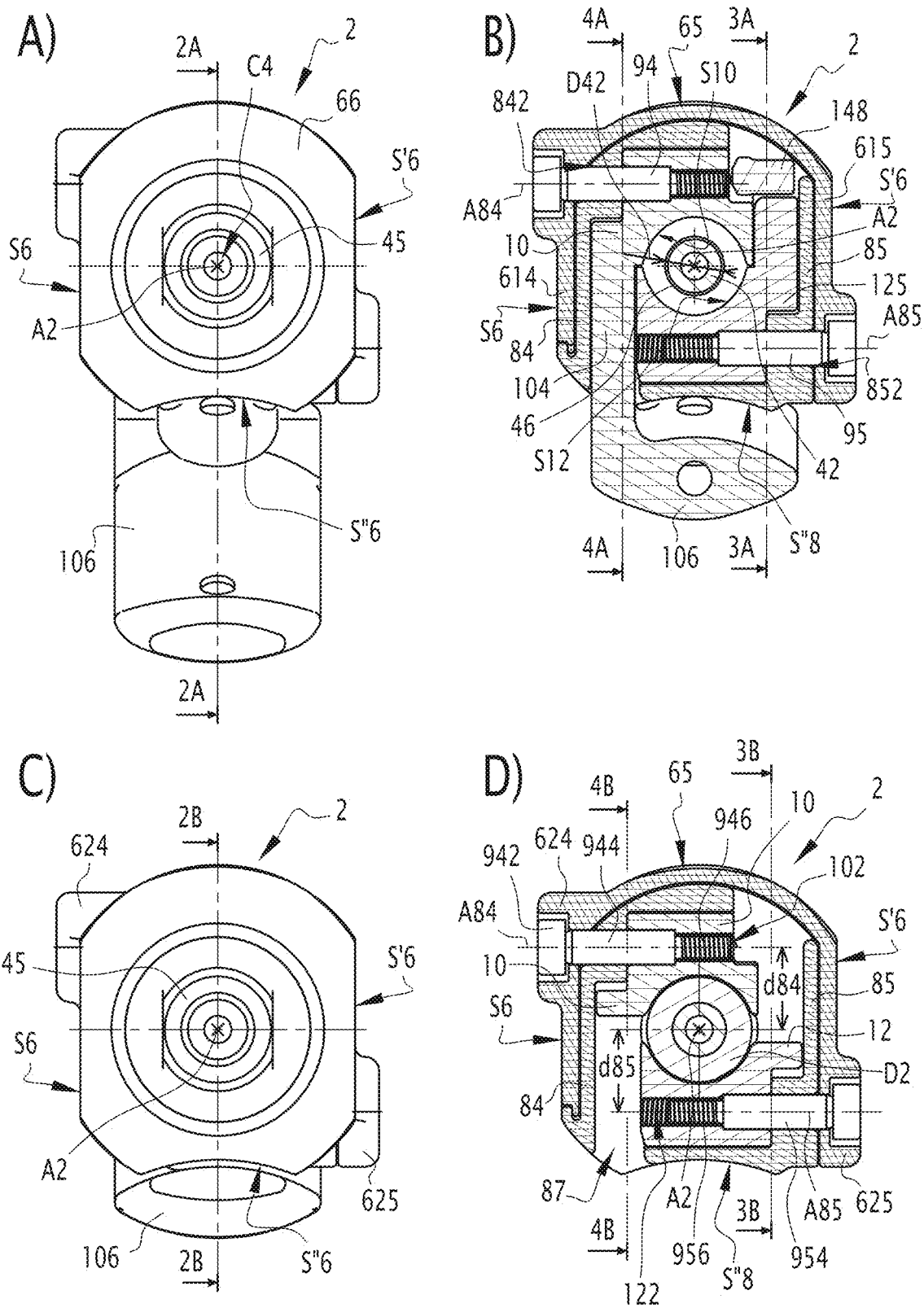
FIG. 1 shows, on four inserts A), B), C) and D), two elevation views and two cross-sections of a coupling element according to the invention, in two different configurations. Insert B) represents a section along plane 1B-1B visible on insert A) of FIG. 2. Insert D) represents a cross-section and along plane 1D-1D visible on insert B) of FIG. 2.

The quick-coupling element 2 shown in FIGS. 1 to 5 is designed to be connected, on the one hand, to a pipe C2 and, on the other hand, to a hose D2. For the clarity of the drawing, the pipe C2 is shown only in FIG. 2, in dash-dot lines, and the hose D2 is shown only in FIGS. 1, 2, 4 and 5. A hose is a special type of pipe for fluid flow, which has the particularity of being flexible and which can expand radially. The hose D2 herein forms a coupling element mating to the coupling element 2.

The fluid passing through the pipe C2 and through the hose D2 may be a liquid or a gas, in particular with a relatively high pressure, e.g. greater than or equal to 1 MPa.

The front side of the coupling element 2 is defined as the side oriented towards the hose D2 during the fitting on of the coupling element 2 and of the hose D2 or when said elements are connected. In FIGS. 2 to 5, the front side of the coupling element 2 is oriented to the left and the rear side is oriented to the right. The coupling element 2 extends, between the front and rear sides thereof, along a longitudinal axis A2.

The elevation views shown in FIG. 1 are taken from the rear of the coupling element 2.

The coupling element comprises a cannula 4 which extends along the longitudinal axis A2 and which has a chamfered front part 42 and a tapped rear part 44. The cannula 4 defines a channel C4 for the passage of fluids between the front and rear parts 42 and 44 thereof.

D4 denotes the external diameter of the cannula 4 over the greater part of the length thereof, between the front and rear parts thereof. D42 denotes the external diameter of the front part 42, which is small compared to the external diameter D4. The passage section of the channel C4 has, at the front part 42, a surface area smaller than the surface area thereof in the intermediate part and at the rear part 44.

The front part 42 of the cannula 4 is provided with two peripheral ribs 46 which form reliefs for holding the hose D2 on said part.

The front part 42 has a chamfer 48 converging toward the front and the function of which is to facilitate the insertion of the cannula 4 into the hose D2.

The rear part 44 is equipped with an internal tapping 49 for mounting the pipe C2.

In the example of the figures, the cannula 4 is in one-piece. In a variant (not shown), same may consist of a plurality of parts assembled in leak-tight manner with one another.

Close to the rear part 44 thereof, the cannula 4 comprises a collar flange 45 and an external thread 47.

The coupling element 2 further comprises a body 6 which is in one-piece and which extends along the longitudinal axis A2, between a front end 62 and a rear end 64. Seen from the pipe C2, the rear end 64 is a proximal end and the front end 62 is a distal end of the body 6.

At the front or distal end 62 thereof, the body 6 defines a mouth 63 centered on the longitudinal axis A2 and through which the front part 42 of the cannula 4 protrudes, toward the front of the coupling element 2. The mouth 63 gives access to the front part 42 of the cannula.

The diameter of the mouth 63 is denoted by D63.

The internal volume of the body 6 is denoted by V6. The cannula is, for the most part, received in the internal volume V6, except for the part of the front part 42 protruding through the mouth 63.

At the rear end 64 thereof, the body 6 is provided with a tapping 67 which cooperates with the thread 47 of the cannula 4 to screw the cannula 4 into the body 6 until the collar flange 45 abuts against the rear or proximal end 64, which secures the elements 4 and 6 and positions the cannula 4 with respect to the body 6 along the longitudinal axis A2.

The diameter of the tapping 67 is denoted by D67. The tapping defines a proximal opening for the passage of the cannula 4 through the body 6.

66 denotes the intermediate part of the body 6 defined along the axis A2 between the front and rear ends 62 and 64 thereof. At the intermediate part 66, the body 62 has an external geometry generally in the form of a cylinder truncated by two planes, parallel to the planes of FIGS. 2 to 4 and which define two lateral surfaces S6 and S'6 arranged on either side of the sectional plane of insert A) shown in FIGS. 2. 614 and 615 respectively denote the generally flat lateral walls of the body 6 which define, on the outside, the surfaces S6 and S'6.

The body 6 also defines a concave external surface S"6 which is situated between the surfaces S6 and S'6, at the lower part of the body 6 in the position shown in FIGS. 1 to 4.

Between the surfaces S6, S'6 and S"6, the body 6 has outer serrations 65 which facilitate the grip thereof.

On the side of the concave surface S"6 and on the front thereof, the body 6 defines an opening O6 with an overall rectangular shape and through which a housing 8 is engaged in the internal volume V6 of the body 6.

The housing 8 comprises a front face 82 which is perpendicular to the longitudinal axis A2 in the mounted configuration of the housing 8 in the body 6 and wherein is provided a circular orifice 83 which is aligned with the mouth 63 in said configuration. The orifice 83 serves for the passage of the front part 42 of the cannula 4 and of the hose D2.

The housing 8 comprises two lateral walls 84 and 85 which extend parallel to each other from a cover 86. The cover 86 closes the opening O6 in the mounted configuration of the housing 8 in the body 6 and defines a concave surface S'8 which is flush with the surface S"6 of the body 6 in such configuration.

A notch 87 is provided in the cover 86 and opens onto the rear side of the housing 8.

In the mounted configuration of the housing 8 in the body 6, the lateral walls 84 and 85 extend parallel to the lateral walls 614 and 615, and thus parallel to the surfaces S6 and S'6. Preferably, the lateral walls 84 and 85 extend along the lateral walls 614 and 615 respectively, into the internal volume V6, and thus on the inside of the lateral walls 614 and 615.

The lateral wall 84 is pierced by a through orifice 842 provided at a thickened part of the lateral wall 84 and which defines a bearing centered on an axis A84 perpendicular to the longitudinal axis A2 and spaced from same by a distance D84, measured perpendicular to the axes A2 and A84, which is non-zero. In the same way, the lateral wall 85 is pierced by a through orifice 852 provided at the thickened part of the wall 85. The through orifice 852 defines a bearing centered on an axis A85. The axis A85 is perpendicular to the axis A2 and is located at a non-zero distance d85 from the axis A2, the distance d85 being measured perpendicular to the axes A2 and A85.

Advantageously, and as shown in the figures, the axes A84 and A85 are parallel and the distances d84 and d85 are equal. Thereby, in a transverse plane of the coupling element 2, i.e. a plane perpendicular to the longitudinal axis A2, the axes A84 and A85 are symmetrical with respect to the longitudinal axis A2. However, the above is not mandatory.

The body 6 is provided, at the surfaces 614 and 615 thereof, with two seats 624 and 625 which are aligned with the through orifices 842 and 852, respectively, and centered on the axes A84 and A85 in the mounted configuration of the housing 8 in the body 6.

The coupling element 2 also comprises a first jaw 10 and a second jaw 12.

The first jaw 10 is articulated about the axis A84 on the body 6 equipped with the housing 8. To this end, a first partially threaded screw 94 is inserted into the bearing formed by the through orifice 842, extending through the seat 624 and being screwed into the jaw 10. The head 942 of the screw 94 is received in the seat 624, whereas the rod 944 thereof extends through the orifice 842 and is screwed, by a threaded part 946, into a tapped orifice 102 of the jaw 10.

In a comparable manner, the second jaw 12 is articulated about the axis A85 by means of a partially threaded screw 95 the head 952 of which is received in the seat 625, the rod 954 of which extends through the orifice 852 and is screwed by a threaded part 956, in a tapped orifice 122 of the jaw 12.

Each of the first and second jaws 10 and 12 is movable about the axis A84 or the axis A85, respectively, relative to the body 6 equipped with the housing 8, between a clamping position and a retracted position, in other words, a released position. The axis A84 is thereby a first axis of rotation of the first jaw 10, whereas the axis A85 is a second axis of rotation of the second jaw 12. In the clamping position thereof, if the hose D2 is fitted onto the cannula 4, the jaw 10 or 12 presses the hose against the outer radial surface S42 of the front part 42 of the cannula. In the retracted position thereof, the jaw 10 or 12 does not press the hose against the outer radial surface of the front part of the cannula.

Figure 2:
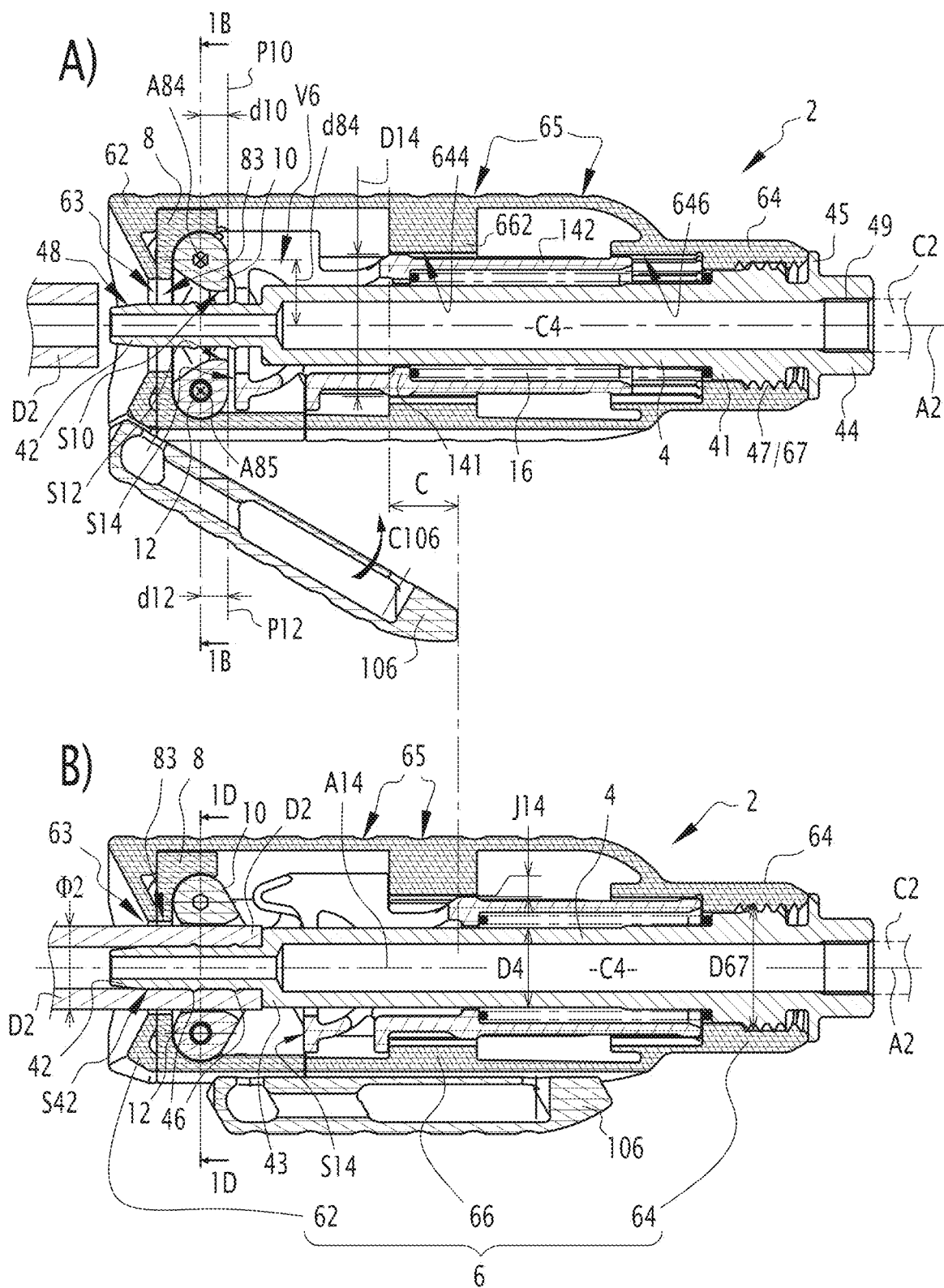
FIG. 2 shows, on two inserts A) and B), two longitudinal sections of the coupling element, taken respectively along the plane 2A-2A and along the plane 2B-2B at the inserts A) and C) of FIG. 1.
Figure 3:
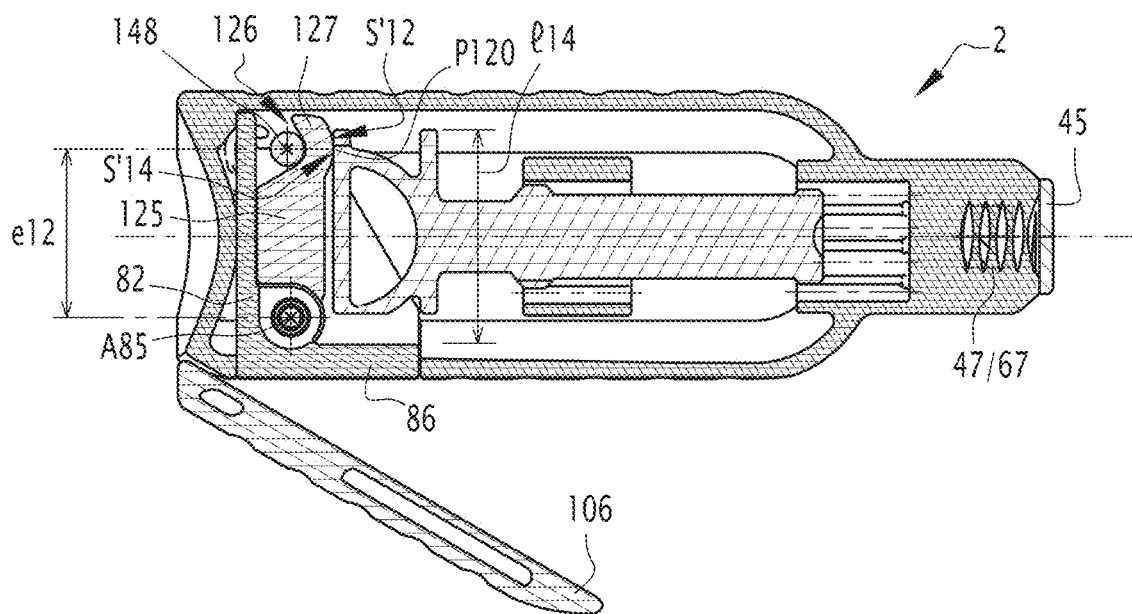
FIG. 3 shows, on two inserts A) and B), two longitudinal sections of the same coupling element, taken along the plane 3A-3A and along the plane 3B-3B on the inserts B) and D), respectively, of FIG. 1.
Figure 3:
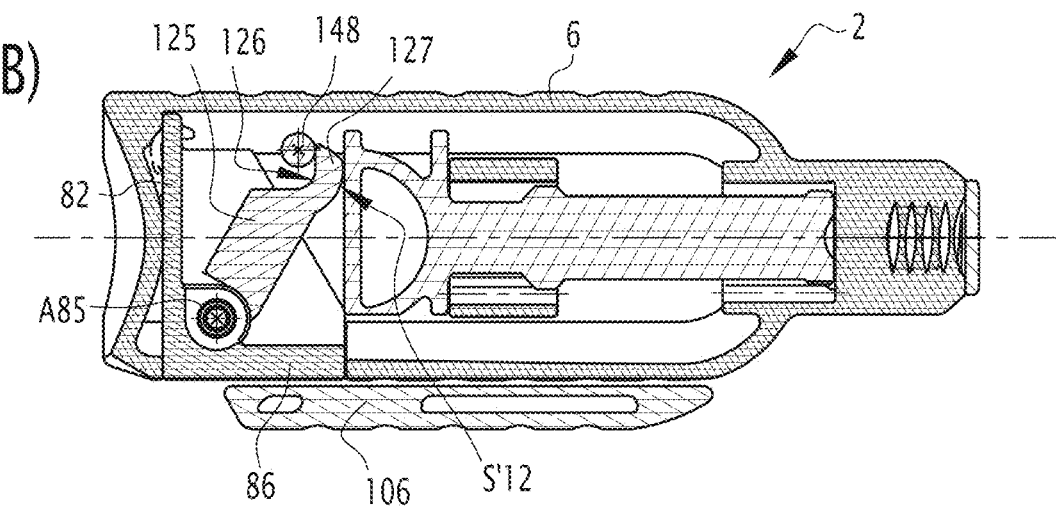
Figure 4:
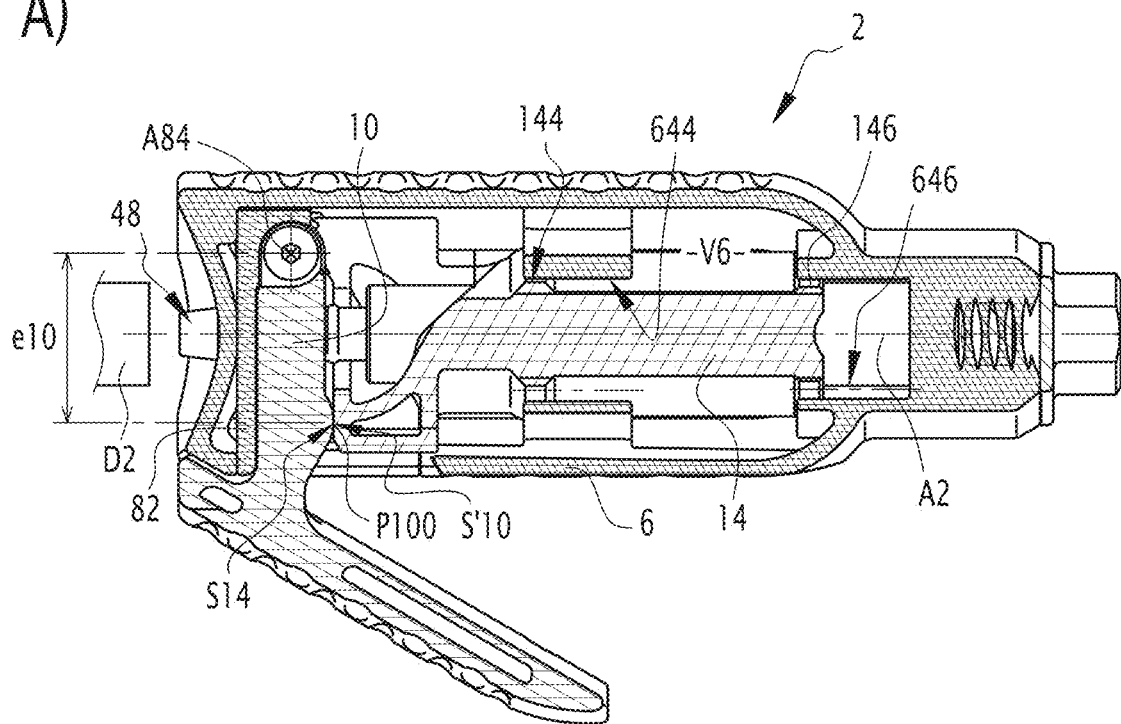
FIG. 4 shows, on two inserts A) and B), two longitudinal sections of the same coupling element, taken along the plane 4A-4A and along the plane 4B-4B on the inserts B) and D), respectively, of FIG. 1.
Figure 4:
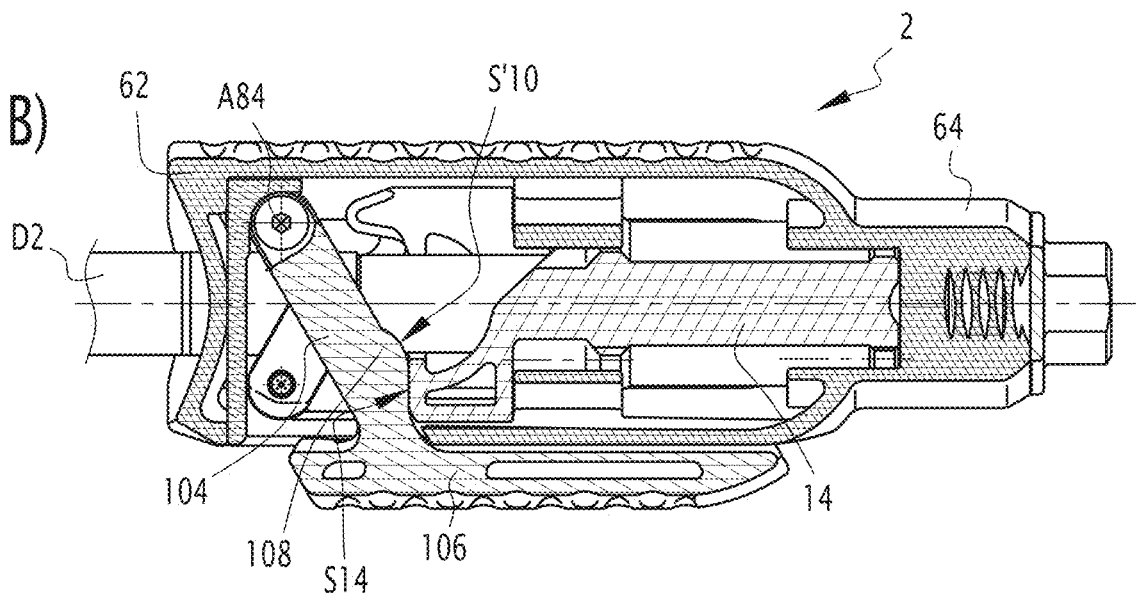
Figure 5:
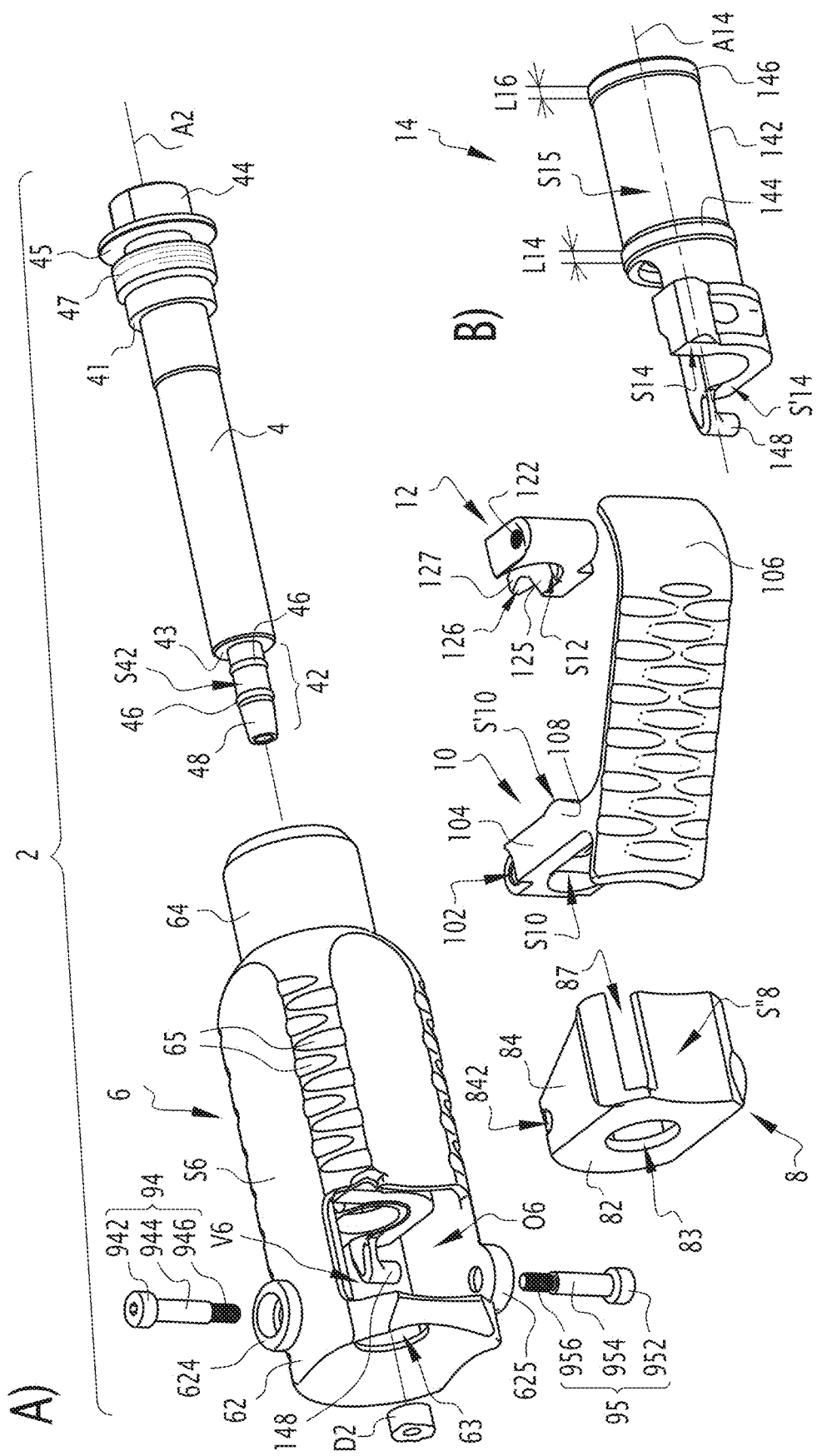
FIG. 5 shows, on two inserts A) and B), the coupling element in perspective and in exploded view, as well as a pusher belonging to the coupling element, also in perspective.

The clamping position of the jaws 10 and 12 is shown on the inserts A) and B) of FIG. 1 as well as on the inserts A) of FIGS. 2 to 4, the hose being shown on the outside of the coupling element 2 on the insert A) of FIGS. 2 and 4. The retracted position of the jaws 10 and 12 is shown on the insert D) of FIG. 1, as well as on the inserts B) of FIGS. 2 and 4, the hose D2 being shown in the unclamped position on the front part 42 of the cannula 4 on the insert B) of FIGS. 2 and 4.

The first jaw 10 defines a bearing surface S10 on the hose D2, when the first jaw 10 is in the clamping position thereof and when the hose is fitted onto the cannula. The second jaw S12 also defines a bearing surface S12 against the hose D2 when the second jaw 12 is in the clamping position thereof and when the hose is fitted onto the cannula.

Each bearing surface S10 or S12 has a progressive profile with respect to the front part 42 of the cannula 4 which is such that, when the jaw 10 or 12 is in the clamping position, the distance between the longitudinal axis A2 and an orthogonal projection of the bearing surface S10 or S12 on a plane perpendicular to the longitudinal axis, is less than half the external diameter φ2 of the free hose D2 fitted onto the front part 42 of the cannula 4, whereas, when the jaw 10 or 12 is in the retracted position, the distance between the longitudinal axis A2 and the projection of the bearing surface S10 or S12 onto the same perpendicular plane is greater than half the external diameter φ2.

The zone defined by the bearing surface S10, wherein the first jaw 10 presses on the hose D2 against the front part 42 of the cannula 4 in the clamping position of the first jaw, is comprised, radially to the longitudinal axis A2, between the longitudinal axis and the first axis of rotation A84. In the clamping position, the zone wherein the first jaw 10 presses on the hose D2 is limited toward the rear, i.e. away from the first axis of rotation A84 along the longitudinal axis A2, by a boundary plane P10 which is perpendicular to the longitudinal axis A2 and which passes through the point on the bearing surface S10 furthest from the first axis of rotation A84 along a direction parallel to said longitudinal axis. d10 denotes the distance, measured parallel to the longitudinal axis A2, between the first axis of rotation A84 and the boundary plane P10.

The distance D10 is the maximum lever arm of the resisting force exerted by the hose D2 on the first jaw 10 in the clamping position, when the hose is fitted onto the cannula 4.

The zone defined by the bearing surface S12, wherein the second jaw 12 presses on the hose D2 against the front part 42 of the cannula 4 in the clamping position of the second jaw, is comprised, radially to the longitudinal axis A2, between the longitudinal axis and the second axis of rotation A85. In the clamping position, the zone wherein the second jaw 12 presses on the hose D2 is limited toward the rear, i.e. away from the second axis of rotation A85 along the longitudinal axis A2, by a boundary plane P12 which is perpendicular to the longitudinal axis A2 and which passes through the point on the bearing surface S12 furthest from the second axis of rotation A85 along a direction parallel to said longitudinal axis. d12 denotes the distance, measured parallel to the longitudinal axis A2, between the second axis of rotation A85 and the boundary plane P12.

The distance d12 is the maximum lever arm of the resisting force exerted by the hose D2 on the second jaw 12 in the clamping position, when the hose is fitted onto the cannula 4.

In the example in the figures, the axes of rotation A84 and A85 are arranged at the same level along the longitudinal axis A2, as are the boundary planes P10 and P12. Thereby, the distances D10 and D12 are equal.

However, thereof is not mandatory and other spatial distributions of the first and second axes of rotation A84 and A85 and of the first and second boundary planes P10 and P12 are conceivable.

The first jaw 10 comprises a lateral arm 104 which extends radially to the first axis of rotation A84 and which defines a surface S'10 for receiving a force. The force-receiving surface S'10 is formed on the rear of the lateral arm 104 and opposite the first axis of rotation A84 with respect to the longitudinal axis A2. In other words, in a plane parallel to the longitudinal axis A2 and perpendicular to the first axis of rotation A84, the first axis of rotation A84 and the force-receiving surface S'10 are located on either side of the longitudinal axis A2, as shown in FIG. 4.

The second jaw 12 further comprises a lateral arm 125 which extends radially to the second axis of rotation A85 and which defines a force-receiving surface S'12. The force-receiving surface S'12 is provided on the rear of the lateral arm 125. In a plane parallel to the longitudinal axis A2 and perpendicular to the second axis of rotation A85, the second axis of rotation A85 and the force-receiving surface S'12 are arranged on either side of the longitudinal axis A2, as shown in FIG. 3.

The lateral arm 125 is provided, at the end thereof opposite the tapped orifice 122, with a hook 127 which defines a concave recess 126. The force-receiving surface S'12 is formed on the outside of the hook 127, opposite the concave recess 126.

In the assembled configuration of the coupling element 2, the lateral arms 104 and 125 are adjacent to the lateral walls 84 and 85, respectively, of the housing 8 and arranged on the inside of the walls, with respect to which same can pivot about the axes of rotation A84 and A85, respectively.

The first jaw further comprises a maneuvering member formed by a lever 106 which protrudes from the body 6 and from the housing 8 through the notch 87. The lever 106 is in one-piece with the part of the first jaw 10 wherein the tapped orifice 102, the bearing surface S10 are provided, as well with the lateral arm 104, and hence with the force-receiving surface S'10.

The lever 106 makes it possible to maneuver the first jaw 10 between the clamping position thereof and the retracted position thereof, by pressing the lever 106 toward the surfaces S"6 and S"8, which makes same to pivot about the first axis of rotation A84, counter-clockwise in FIG. 2. The clamping position of the insert A) of FIGS. 2 to 4 is a default position taken by the jaw 10 if no force is exerted on the lever 106 by a user of the coupling element 2.

The coupling element 2 also comprises a pusher 14 which extends along a longitudinal axis A14 coinciding with the longitudinal axis A2 in the mounted configuration of the coupling element 2.

The pusher 14 is mounted inside the body 6, in the internal volume V6 and around the cannula 4, between the front and rear parts 42 and 44 thereof along the longitudinal axis A2, being subject to the action of an elastic member, in the example formed by a spiral spring 16 which tends to push the pusher 14 forwards, i.e. toward the front end 62 of the body 6. The advanced position of the pusher 14, shown in the inserts A) of FIGS. 2 to 4, is a default position of the pusher, taken by the latter under the action of the spiral spring 16 as long as a user does not fold the lever 106 toward the surfaces S"6 and S"8.

In a variant, the spring 16 can be replaced by another elastic member for returning the pusher toward the front of the body 6.

The pusher 14 is designed to move longitudinally, i.e. in translation parallel to the longitudinal axis A2, with respect to the body 6, the housing 8 and the jaws 10 and 12. The pusher thus forms a slide with respect to the body 6, the housing 8 and the jaws 10 and 12.

The pusher 14 comprises an annular skirt 142 centered on the axis A14 and provided, at each of the ends thereof, with an outer radial guiding surface, namely, a front outer radial guiding surface 144 and a rear outer radial guiding surface 146.

In practice, the outer radial guiding surfaces 144 and 146 have a circular cross-section. Thereby, the outer guiding surfaces are each inscribed in a cylinder with a circular base, of diameter D14 or D16.

D14 and D16 denote the diameters thereof, which preferably have the same value.

In a variant of the invention (not shown), the diameters D14 and D16 have different values.

L14 denotes the axial length of the front outer radial guiding surface 144 and L16 denotes the axial length of the rear outer radial guiding surface 146, the axial lengths being measured parallel to the longitudinal axis A14.

In the example, and according to an advantageous aspect of the invention, the lengths L14 and L16 are equal.

In a variant of the invention (not shown), same may be different.

S15 denotes the outer radial surface of the skirt 142 situated, along the longitudinal axis A14, between the outer radial guiding surfaces 144 and 146 which are spaced from each other along the longitudinal axis A2. The diameter of the surface S15 is denoted by D15.

The diameter D15 is strictly smaller than the diameters D14 and D16. In other words, the surface S15 defines a cylindrical junction surface the diameter D15 of which is less than the diameter D14 of the front outer radial guiding surface 144 and the diameter D16 of the rear outer radial guiding surface 146.

The body 6 is provided with a front inner radial guiding surface 644 and a rear inner radial guiding surface 646, both centered on the longitudinal axis A2. The front inner radial guiding surface 644 is formed at the center of an inner peripheral rib 662 of the intermediate part 66 of the body 6. The rear inner radial guiding surface 644 is formed at the junction between the intermediate 66 and rear 64 parts of the body 6.

L64 and L66 denote the axial length of the front and rear internal radial surfaces 644 and 646, respectively, the axial lengths being measured parallel to the longitudinal axis A2.

The front inner radial surface 644 is provided with grooves 648 which extend throughout the length L64 thereof, whereas the rear inner radial guiding surface 646 is provided with grooves 650 which extend throughout the length L66 thereof.

In a radial plane perpendicular to the longitudinal axis A2, the apexes of the ribs which separate the grooves 648 define a circle inscribed in the front inner radial guiding surface 644, the diameter of which is denoted by D64. Similarly, in a plane radial to the longitudinal axis A2, the apexes of the ribs which separate the grooves 650 define a circle inscribed on the rear inner radial guiding surface 646, the diameter of which is denoted by D66. Thereby, the internal guiding surfaces are each inscribed around a cylinder with a circular base, of diameter D64 or D66.

The diameters D64 and D66 advantageously have the same value, as do the diameters D14 and D16.

In a variant of the invention (not shown), the diameters D64 and D66 have different values.

In any case, the diameters D14, D64, D16 and D66 are chosen so that the radial guiding surfaces 144 and 644, on the one hand, and 146 and 646, on the other hand, effectively guide the pusher 14 in translation along the axis A2, inside the body 6, during the sliding thereof with respect to the body 6.

The ratio of the diameters D14 and D64 and the ratio of the diameters D16 and D66 are such that a guiding clearance J14 of relatively small radial thickness, e.g. on the order of a few tenths of a millimeter, is provided between the outer and inner radial guiding surfaces 144 and 644, on the one hand, and 146 and 646, on the other. In other words, the diameters D14, D16, D64 and D66 are equal, within the guiding clearance J14.

C denotes the travel of the pusher 14 under the action of the spring 16. The travel corresponds to the passage of the pusher 14 from the position of the insert B) in one of the FIGS. 2 to 4, which is a rear position of the pusher 14 with respect to the body 6, to the position of the insert A) in said figures, which is a forward position of the pusher 14 with respect to the body 6, or vice versa when moving from the position of the insert A) to the position of the insert B).

The length L64 is greater than or equal to the sum of the length L14 and of the travel C. Similarly, the length L66 is greater than or equal to the sum of the length L16 and of the travel C.

We have the following relations:

$$L64 \geq L14 + C \qquad \text{(equation 1)}$$

$$L66 \geq L16 + C \qquad \text{(equation 2)}$$

By means of said relations between the lengths L14 and L64, L16 and L66 and the travel C, during the operation of the coupling element 2, the front outer radial guiding surface 144 remains opposite the front inner radial guiding surface 644 and the rear outer radial guiding surface 146 remains opposite the rear inner radial guiding surface 646 along the longitudinal axis A2.

On the front side thereof, the pusher 14 defines a first bearing surface S14 which is perpendicular to the axis A14 and which abuts against the force-receiving surface S'10 of the first jaw 10, under the action of the return spring 16, provided that the lever 106 is not folded back toward the body 6, i.e. when the first jaw 10 is by default in the clamping position thereof. In other words, by default, the elastic force of the spring 16 is transmitted to the pusher 14 which exerts, via the first bearing surface S14 and on the-force receiving surface S'10, an axial force directed forwards, the effect of which is to return the first jaw 10 to the clamping position thereof.

Thereby, the return spring 16, which is a member for elastically returning the pusher 14 to the advanced position thereof, is also a member for returning the first jaw 10 to the clamping position thereof.

The pusher 14 is oriented about the axis A2 in such a way that the bearing surface S14 thereof is situated, in a plane perpendicular to the first axis of rotation A84, on the side of the longitudinal axis A2 opposite the first axis of rotation 84. A radial gap measured perpendicular to the longitudinal axis A2 in a plane perpendicular to the first axis of rotation A84 is denoted by e10; between the first axis of rotation A84 and the point of contact P100 of the force-receiving surface S'10 of the first jaw 10 and the surface S14 in the plane perpendicular to the first axis of rotation A84. The plane perpendicular to the first axis of rotation A84 is, in the example shown in the figures, the plane shown in FIG. 4, where the radial gap e10 is identified.

The radial gap e10 is the lever arm with respect to the axis of rotation A84 of the force transmitted between the surfaces S14 and S'10 when the first jaw 10 is in the clamping position thereof. The radial difference e10 has a value greater than the value of the first distance D10.

Thereof comes in particular from the fact that the force-receiving surface S'10 is provided on the edge of a protrusion 108 defined by the lateral arm 104, opposite the tapped orifice 102 with respect to a plane parallel to the first axis of rotation A84 and containing the longitudinal axis A2.

Thereby, the lever arm, about the first axis of rotation A84, of the force transmitted between the surfaces S14 and S'10 is greater than the maximum lever arm of the clamping force exerted on the hose 2 by the bearing surface S10 of the first jaw 10. The force transmitted between the surfaces S14 and S'10 is thus amplified by the ratio between the value of the radial gap e10 and the value of the distance d10. It is thus guaranteed that the first jaw 10 is effectively held in the clamping position by the pusher 14 and the spring 16, despite the resisting force exerted by the hose D2.

Advantageously, a ratio between the value of the first axial difference e10 and the value of the first distance d10 is comprised between 1.5 and 10, preferably between 4 and 6, and more preferably equal to 5.

The pusher 14 also defines a second bearing surface S'14 which, in the example shown in the figures, is coplanar with the first bearing surface S14, even if thereof is not mandatory.

The second bearing surface S'14 is preferably perpendicular to the longitudinal axis A14 and is configured to abut against the force receiving-surface S'12 of the second jaw 12, as can be seen in FIG. 3.

A radial gap measured perpendicular to the longitudinal axis A12 and in a plane perpendicular to the second axis of rotation A85 shall be denoted by e12, between the second axis of rotation A85 and the point of contact P120 of the force-receiving surface S'12 of the second jaw 12 and of the surface S'14. The plane perpendicular to the second axis of rotation A85 is, in the example shown in the figures, the plane shown in FIG. 3, where the distance e12 is identified.

The surface S'14 exerts, under the action of the spring 16, a bearing force on the force-receiving surface S'12 which by default returns the second jaw to the clamping position thereof.

The radial distance e12 is the lever arm with respect to the axis of rotation A85 of the force transmitted between the surfaces S'14 and S'12 when the second jaw 12 is in the clamping position thereof. The radial difference e12 has a value greater than the value of the distance D12.

Thereby, the lever arm, about the second axis of rotation A85, of the force transmitted between the surfaces S'14 and S'12, is greater than the maximum lever arm of the clamping force exerted on the hose 2 by the bearing surface S12 of the second jaw 12. The force transmitted between the surfaces S'14 and S'12 is thus amplified by the ratio between the radial gap value e12 and the value of the distance D12. It is thus guaranteed that the second jaw 12 is effectively held in the clamping position by the pusher 14 and the spring 16, despite the resisting force exerted by the hose D2.

The pusher 14 also comprises a finger 148 which is engaged in the recess 126 of the second jaw 12. The finger 148 is a relief of the pusher 14 intended to interact with the second jaw 12. In a variant, the finger 148 may be replaced by another relief. Whether the finger or some other relief is involved, same exerts on the second jaw 12 a force to move the jaw from the clamping position thereof to the retracted position thereof, as explained hereinafter.

When a user exerts a torque C106 on the lever 106 about the first axis of rotation A84, the effect of which is to change the lever and hence the whole of the first jaw 10 from the position of the inserts A) to the position of the inserts B) shown in FIGS. 2 to 4, the arm 104 of the first jaw 10, which is secured to the lever 106, exerts through the protrusion 108 thereof, a force which pushes the pusher 14 toward the rear end 64 of the body 6. In other words, the surface S'10 then forms a bearing surface against the surface S14 which receives the force exerted by the jaw 10, the force having an axial component parallel to the longitudinal axis A2 and oriented rearwards, which opposes the elastic force of the spring 16.

If the torque exerted C106 is sufficiently intense, the pusher 14 moves backwards under the action of the force transmitted between the surfaces S'10 and S14, which is visible by comparing the inserts B) to the inserts A) in FIGS. 2 to 4. Thereof is what makes it possible to return the jaw 10 to the retracted position thereof shown in the inserts B) of FIGS. 2 to 4.

The finger 148 of the pusher 14 moves back with the rest of the pusher, which has the effect of exerting on the concave surface of the hook 127, in the recess 126, a force for driving the jaw 12 toward the rear end 64 of the body 6. Thereof moves the second jaw 12 toward the retracted position thereof shown in the inserts B) of FIGS. 2 to 4.

Thereby, the operation of the lever 106, which consists in folding same down towards the surfaces S"6 and S"8, has the effect of moving the two jaws 10 and 12 from the clamping positions thereof to the respective retracted positions thereof.

Reaching such retraction positions makes it possible to insert the hose D2 onto the front part 42 of the cannula 4, without being hindered by the jaws 10 and 12.

It is then possible for the user to release the lever 106 which then exerts no torque on the first jaw, about the first axis of rotation A84, in such a way that the pusher 14 subject to the action of the spring 16 effectively pushing the two jaws 10 and 12 toward the respective clamping positions thereof, by means of the bearing surfaces S14 and S'14 thereof which act on the force-receiving surfaces S'10 and S'12.

Taking into account the ratio between the values e10/D10 and e12/D12, the elastic force exerted by the spring 16 is amplified and effective to return and then maintain the two jaws 10 and 12 in the clamping position, despite the resisting force exerted on the bearing surfaces S10 and S12 by the outer radial surface of the hose D2.

I14 denotes the maximum width of the pusher 14 measured perpendicularly to the longitudinal axis A14. The width defines the radial size of the pusher 14, i.e. the minimum diameter of a circle through which the pusher 14 can extend.

The width I14 is strictly greater than the diameters D63 and D67.

Thereby, the pusher cannot be inserted into the body 6, or leave therefrom, through the front 62 and rear 64 ends thereof.

For the purpose of optimizing the manufacturing range of the coupling element 2, the components 6 and 14 are produced simultaneously by additive manufacturing by binder jetting, sometimes referred to as "additive machining by binder jetting". The principle of additive machining by jet of binder consists in depositing a thin layer of powder material, then in applying a binder which will agglomerate the powder grains exposed to heat or light. The source of heat or of light is movable in a plane and makes possible the agglomeration of grains corresponding to a slice of the parts. The production of the parts is thus carried out in successive slices parallel to an initial laying plane. In the case of simultaneous machining of the body 6 and of the pusher 14, the initial laying plane may be chosen as the plane perpendicular to the longitudinal axis A2 and situated at the end of the rear end 64 of the body. The body 6 and the pusher 14 are made slice by slice simultaneously without it being necessary to provide a connection between the two parts. The parts are held in place by powder grains that have not been agglomerated. Once the body 6 and the pusher 14 have been produced, it is necessary to discharge the grains of powder which have not been agglomerated.

The body 6 and the pusher 14 are made of the same material. For example, the powder may be a polyamide and the binder may be activated by heat.

Additive manufacturing makes it possible to produce, in one operation, a first hollow part wherein a second part is arranged, such as the body 6 wherein the pusher 14 is arranged, without limiting the fitting of the second part within the first hollow part.

Figure 6:
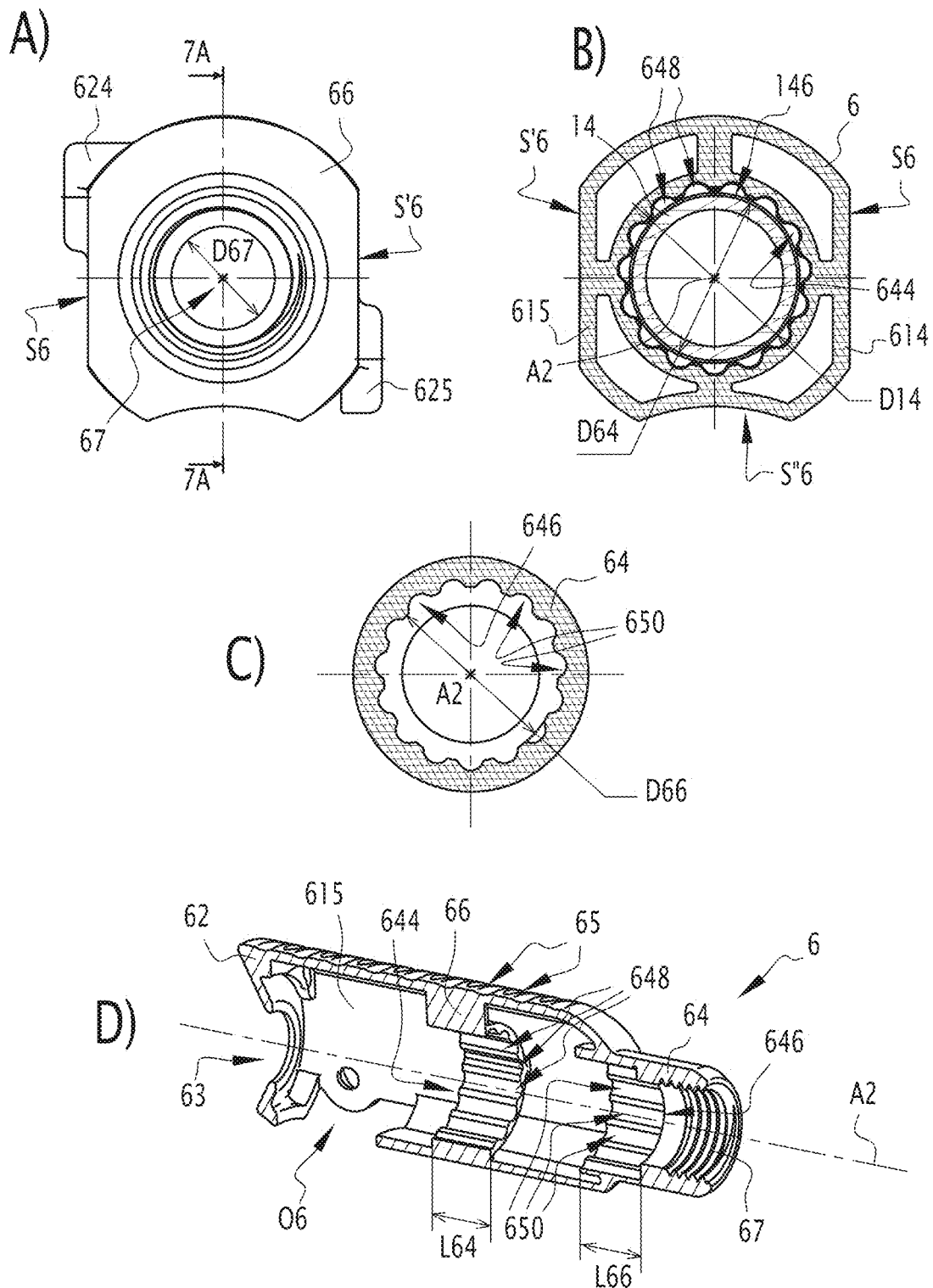
FIG. 6 shows, on three inserts A), B) and C), an elevation view and cross-sections of a body and a pusher of the coupling element of FIGS. 1 to 5 being manufactured, as well as on one insert D), a longitudinal perspective section of the body, on a smaller scale.
Figure 7:
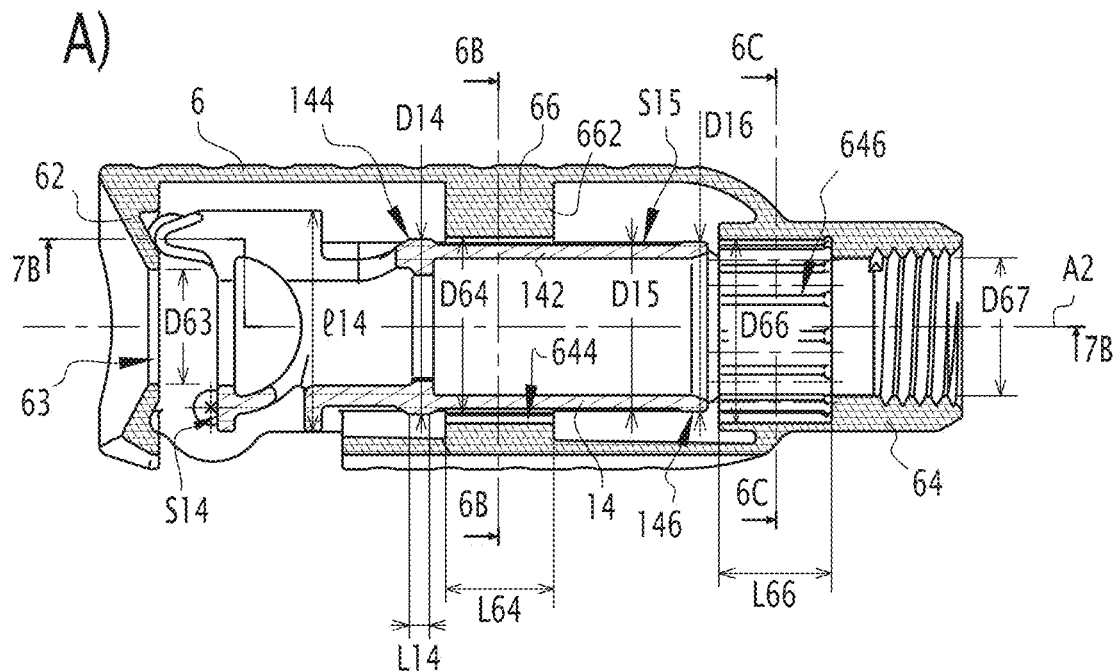
FIG. 7 shows, on two inserts A and B, two longitudinal sections of the body and of the pusher, taken along the plane 7A-7A at insert A) in FIG. 6 and along the line 7B-7B at insert A) in FIG. 7, respectively.
Figure 7:
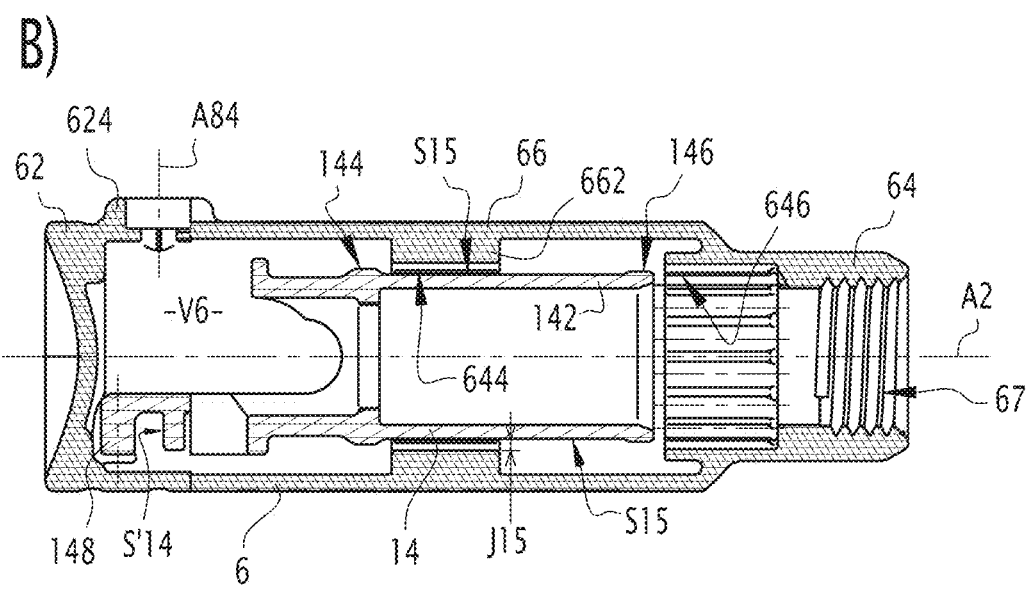

To make possible such additive manufacturing, the pusher 14 is movable inside the body 6 as far as a reference position shown in FIGS. 6 and 7 wherein the outer radial surfaces 144 and 146 of the pusher 14 are disengaged from the inner radial surfaces 644 and 646 of the body 6. In other words, in the reference position, the outer radial guiding surfaces 144 and 146 are offset axially, along the longitudinal axis A2, from the inner radial guiding surfaces 644 and 646.

In the reference position, the rear part of the skirt 142 is no longer engaged in the rear part 64 of the body 6 and the front part of the skirt 142 is situated further forward, along the longitudinal axis A2, than the internal rib 662.

In the reference position, the outer and inner radial guiding surfaces 144, 146, 644 and 646 can be produced by localized application of the binder to the powder, without risk of contact or untimely attachment between the surfaces, even if the guiding clearance J14 has a small radial thickness, since same are axially offset from each other along the longitudinal axis A2.

In the reference position, the front inner radial guiding surface 644 faces, i.e. is axially aligned along the longitudinal axis A2 with the junction surface S15.

Thereby, there is a manufacturing clearance J15 between the junction surface S15 and the inner radial surface 644. The manufacturing clearance J15 has a radial thickness strictly greater than the radial thickness of the guiding clearance J14.

For example, the manufacturing clearance J15 may have a radial thickness greater than or equal to 0.5 mm, preferably equal to 1 mm.

In other words, in the reference position which is used for the additive manufacturing of the elements 6 and 14 of the coupling element 2, there is a relatively large radial clearance J15 between the pusher 14 and the rib 662, the radial clearance being thicker than the clearance J14 which serves to guide the pusher 14 in translation relative to the body 6.

Thereof facilitates the removal of powder grains that are not bound together by the binder during the additive manufacturing, in the vicinity of the guiding surfaces.

In this respect, the presence of the grooves 648 at the inner radial front guiding surface 644 facilitates the discharge of the excess powder.

The presence of grooves 650 on the rear inner radial guiding surface 646 also facilitates the discharge of excess powder, most particularly in a variant of the invention (not shown), wherein a part of surface comparable to the surface S15 is engaged in the rear inner radial guiding surface 646 in the reference position of the pusher 14.

Once the body 6 and the pusher 14 have been obtained simultaneously by additive manufacturing, the assembly of the coupling element 2 comprises successive steps, carried out in the order hereinbelow and consisting of:

moving the pusher 14 to a rear stop position in the body 6 of the coupling element, i.e. moving the pusher 14 from the reference position shown in FIGS. 6 and 7 to a position comparable to the position of the inserts B) in FIGS. 2 to 4 wherein the outer radial guiding surfaces 144 and 146 are engaged in the inner radial guiding surfaces 644 and 646;

pre-positioning the two jaws 10 and 12 in the housing 8;

engaging the housing 8 equipped with jaws 10 and 12 in the body 6, through the opening O6, taking care that the lateral arm 105 of the second jaw 12 effectively cooperates with the finger 148 of the pusher 14, i.e. by ensuring that the finger 148 is properly engaged in the recess 126 of the second jaw;

fitting and screwing screws 94 and 95 into tapped holes 102 and 122, respectively, of the jaws 10 and 12;

fitting the return spring 16 of the pusher 14 in the internal volume of the body, bearing against a shoulder 141 of the pusher;

fitting and screwing the cannula 4 inside the pusher 14 and the body 6, by means of the thread 47 and the tapping 67, bringing the spring 16 to bear against a shoulder 41 of the cannula.

In order to couple the coupling element 2 and the hose D2, the user takes the body 6 in his/her hand and moves the lever 106 toward the surfaces S"6 and S"8 by exerting the torque C106, which brings the jaws 12 and 14 into the respective retracted positions thereof. It is then sufficient to align the hose D2 along the longitudinal axis A2 and to move the hose toward the cannula 4, while keeping the lever 106 pressed against the body 6. Such operation is facilitated by the fact that the front part 42 of the cannula 4 sticks out from the body 6 and is provided with the chamfer 48.

At a first stage of the approach, the hose D2 comes into contact with the front part 42 of the cannula and slides along the front part. The approach continues until the front face of the hose D2 abuts against a shoulder 43 of the cannula which delimits the rear end of the front part 42. The hose then covers the peripheral ribs 46. The jaws 10 and 12 are still held in the retracted position by the torque C106 which the user continues to exert on the lever 106. The jaws thus do not oppose the fitting together.

By releasing the lever 106, i.e. by ceasing to exert the torque C106, the user allows the jaws to return to the clamping position, under the action of the pusher 14 elastically loaded by the spring 16.

The hose D2 is then mounted, fluidically connected to, and firmly held in relation to, the coupling element 2.

To uncouple the hose D2 from the coupling element 2, it suffices to take the body 6 in hand and to push the lever 106 toward the body by means of the torque C106, which brings the two jaws 10 and 12 back into the respective retracted positions thereof. The user can then grip the hose and pull same parallel to the longitudinal axis A2, in a direction away from the cannula 4. Since the jaws are held in the retracted positions thereof, same do not oppose the removal of the hose D2.

Figure 8:
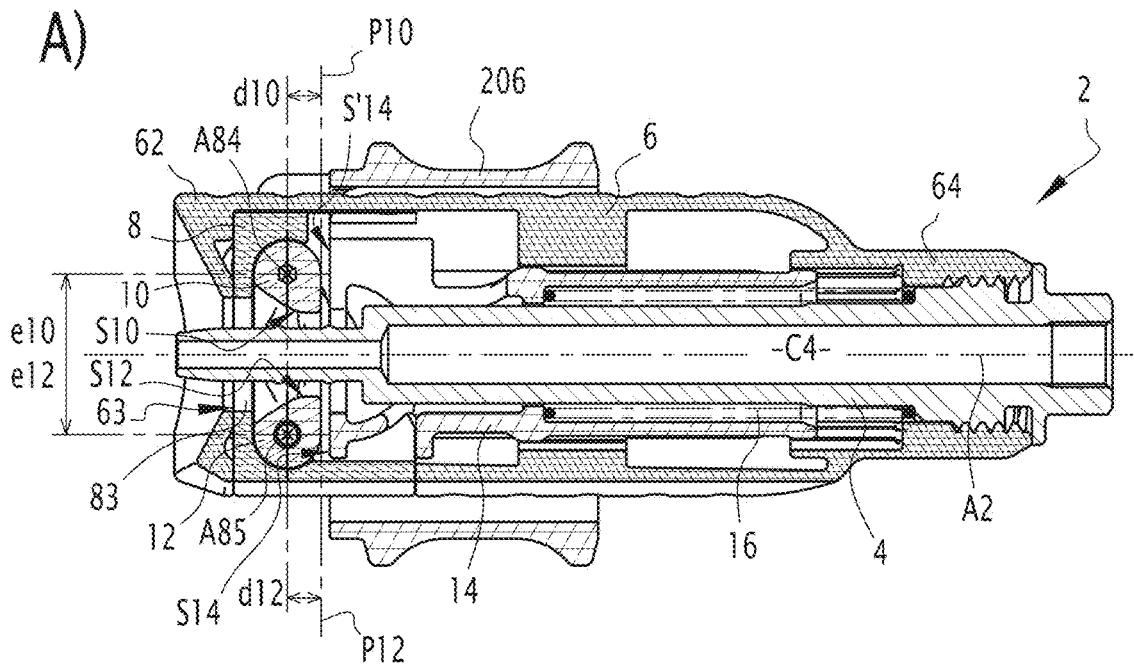
FIG. 8 shows, on two inserts A) and B), two longitudinal sections similar to the sections shown in FIG. 2 for a coupling element according to a second embodiment of the invention.

In the second, third and fourth embodiment of the invention shown in FIG. 8 and seq., elements similar to the elements of the first embodiment have the same references. Hereinafter, we mainly describe what distinguishes said embodiments from the first embodiment. If a reference is given in one of the FIG. 8 et seq. without being mentioned in the description, or mentioned in the description without being mentioned in one of the figures, the reference corresponds to the same element as that identified by the same reference in the first embodiment.

The coupling element 2 of the second embodiment differs from the preceding in that the maneuvering of the pusher 14, against the elastic force exerted by the spring 16, is performed by means of a maneuvering ring 206, secured in translation along the longitudinal axis A2 of the coupling element 2 of the pusher 14 which defines two bearing surfaces S14 and S'14 and which is comparable to same of the first embodiment.

Also, in said embodiment, the body 6 and the pusher 14 are advantageously made together in one-piece by additive manufacturing, using a reference position, as in the first embodiment.

Figure 9:
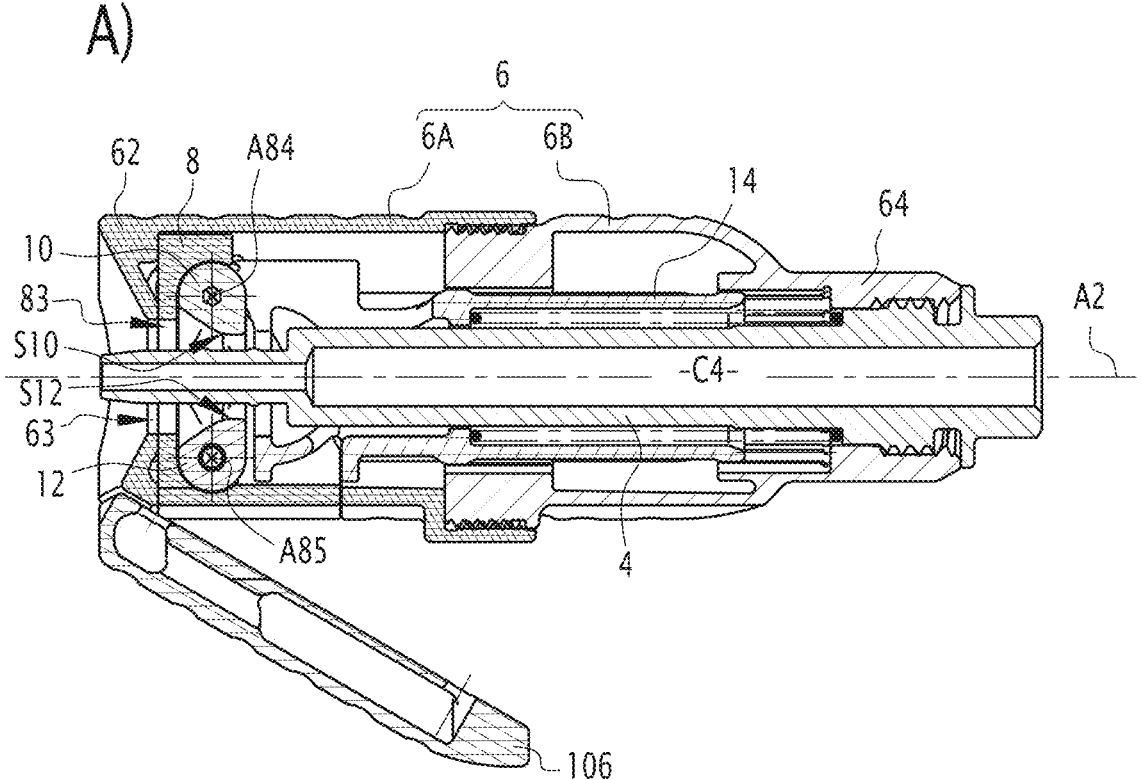
FIG. 9 shows, on two inserts A) and B), a longitudinal section similar to same of insert A) in FIG. 2 for a coupling element according to a third embodiment and an exploded perspective view of the body of the coupling element, on a smaller scale.
Figure 9:
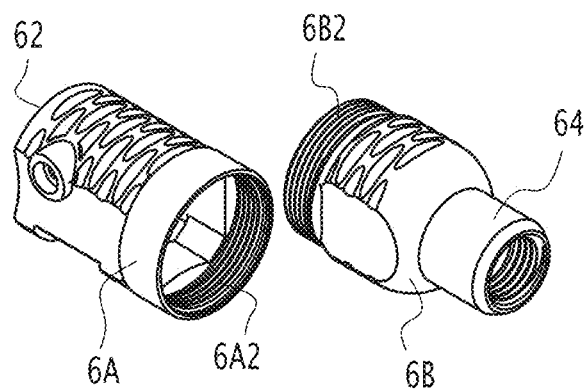

In the third embodiment shown in FIG. 9, the body 6 is in two parts and comprises a front part 6A and a rear part 6B screwed together by means of a tapping 6A2 provided on the front part 6A and a thread 6B2 provided on the rear part 6B. The part 6A defines the front end 62 of the body 6, whereas the rear part defines the rear end 64 thereof.

In a variant of the invention (not shown), the tapping is provided on the rear part 6B and the tapping is provided on the front part 6A.

In said embodiment, it is not mandatory to make the body 6 and the pusher 14 by additive manufacturing. The two parts 6A and 6B of the body 6 can be mounted around the pusher 14.

Figure 10:
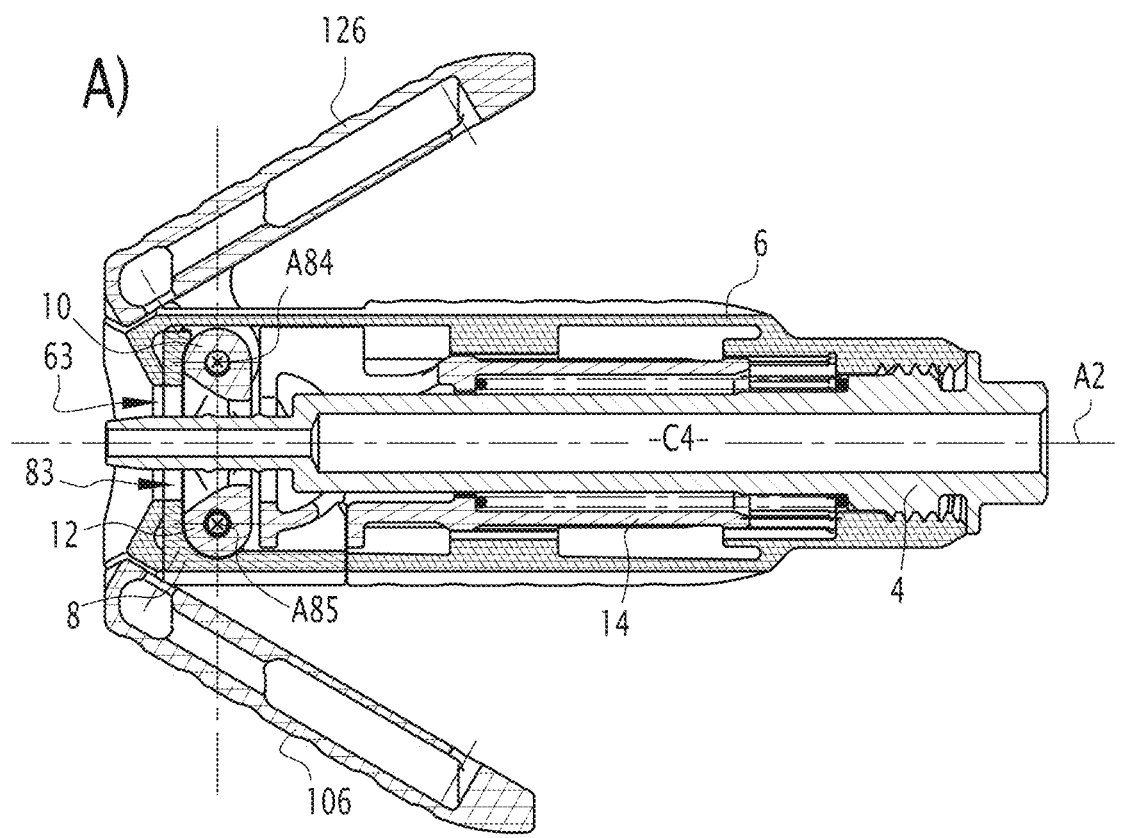
FIG. 10 shows, on two inserts A) and B), two longitudinal sections similar to same of FIG. 2 for a coupling element according to a fourth embodiment of the invention.
Figure 10:
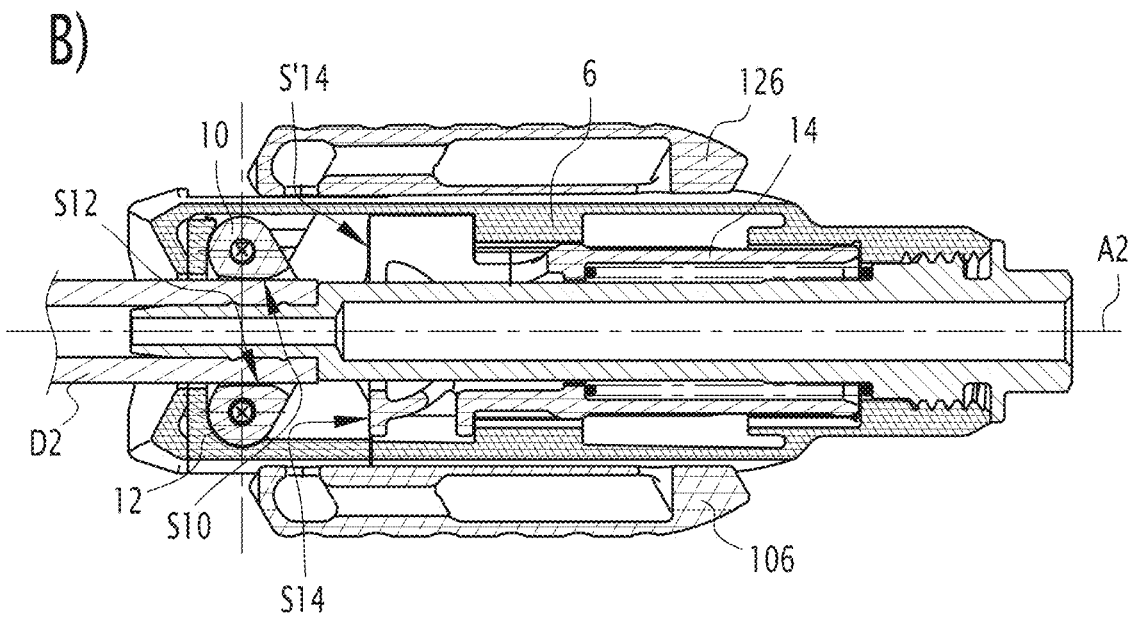

In the fourth embodiment of the invention shown in FIG. 10, the first jaw 10 is controlled by a first lever 106, whereas the second jaw 12 is controlled by a second lever 126. In such case, the jaws can be maneuvered independently of each other, about the first axis of rotation A84 and the second axis of rotation A85, respectively. The pusher 14 may comprise two bearing surfaces S14 and S'14 equivalent to same of the first embodiment but does not comprise any finger comparable to the finger 148 of the first embodiment.

Advantageously, the levers 106 and 126 are in one-piece with the jaws 10 and 12, respectively.

In the fourth embodiment, an additive manufacturing of the body 6 and of the pusher 14 is also provided.

In the second to fourth embodiments, distances d10, d12 and radial gaps e10, e12 defined as in the first embodiment are such that the ratio e10/d10 is strictly greater than 1, as is the ratio e12/d12.

For the first to third embodiments and according to a variant of the invention (not shown), the coupling element may comprise a single jaw movable relative to the body. In such case, a single ratio, of the type of ratio e10/d10, is strictly greater than 1.

Where a diameter is mentioned in the above description, same corresponds to the maximum dimension of a section of a circular opening transverse to the longitudinal axis A2. If the cross-section is not circular, the definition of the maximum dimension in question is suitable for the geometry of the transverse opening.

According to a variant of the invention (not shown), the lengths L14 and L16 are greater than the lengths L64 and L66 plus the travel C.

The following relations stand:

$$L14 \geq L64 + C \quad \text{(equation 3)}$$
$$L16 \geq L66 + C \quad \text{(equation 4)}$$

There too, means of said relations between the lengths L14 and L64, L16 and L66 and the travel C, during the operation of the coupling element 2, the front outer radial guiding surface 144 remains opposite the front inner radial guiding surface 644 and the rear outer radial guiding surface 146 remains opposite the rear inner radial guiding surface 646 along the longitudinal axis A2.

Any feature described in the foregoing for one embodiment or one variant, can be implemented for the other embodiments and variants described hereinabove, provided that is technically feasible.

The present invention relates to a coupling element (2) comprising a cannula, a body (6) and at least one first jaw (10) movable in rotation about a first axis of rotation (A84). In a clamping position, the first jaw presses a hose (D2) against the cannula in a zone defined by a boundary plane spaced from the first axis of rotation by a first distance. The coupling element further comprises a movable pusher (14) having a first bearing surface (S14) configured to exert a movement force on a force-receiving surface (S'10) of the first jaw (10). When the first jaw (10) is in the clamping position thereof, a first radial gap (e10) between the first axis of rotation and a contact point (P10) of the force-receiving surface (S'10) and of the first bearing surface (S14) has a value greater than the value of the first distance.

The invention claimed is:

1. A coupling element for connecting a fluid pipe to a hose, the coupling element comprising:
    a cannula defining a passage for fluids and extending along a longitudinal axis of the coupling element, between a front part configured for fitting on the hose and a rear part to be coupled to the fluid pipe;
    a body extending longitudinally about the cannula and secured thereto, defining a mouth for access to the front part of the cannula;
    a first jaw movable in rotation about a first axis of rotation perpendicular to and offset from the longitudinal axis between a clamping position wherein the first jaw presses the hose against the front part of the cannula in a zone comprised that extends in a radial direction relative to the longitudinal axis between the longitudinal axis and the first axis of rotation, and is bounded along the longitudinal axis by a boundary plane that is perpendicular to the longitudinal axis and spaced from the first axis of rotation by a first, non-zero distance that is measured parallel to the longitudinal axis, and a retracted position wherein the first jaw does not press the hose against a forward portion of the cannula;

a maneuvering member, accessible from outside the body, for moving the first jaw between the clamping position thereof and the retracted position thereof, wherein the coupling element comprises:
- a pusher, housed in an internal volume of the body around the cannula and movable, in translation along the longitudinal axis, relative to the body;
- a member for elastic return of the pusher toward a forward position thereof;
- the pusher is provided with a first bearing surface, bearing against the first jaw;
- the first bearing surface of the pusher is configured to exert on the first jaw a force for moving the first jaw from the retracted position thereof to the clamping position thereof;
- the first bearing surface is arranged opposite the first axis of rotation in relation to the longitudinal axis; and
- when the first jaw is in the clamping position thereof, with the first bearing surface against the first jaw, a first radial gap, measured perpendicular to the longitudinal axis, between the first axis of rotation and a contact point of a force-receiving surface of the first jaw and the first bearing surface has a value greater than the value of the first distance.

2. The coupling element according to claim 1, wherein the member for elastically returning the pusher to the forward position thereof, is also a member for returning the first jaw to the clamping position thereof.

3. The coupling element according to claim 1, wherein a ratio between the value of the first radial gap and the value of the first distance is comprised between 1.5 and 10.

4. The coupling element according to claim 3, wherein the ratio between the value of the first radial gap and the value of the first distance is comprised between 4 and 6.

5. The coupling element according to claim 4, wherein the ratio between the value of the first radial gap and the value of the first distance is equal to 5.

6. The coupling element according to claim 1, wherein:
the first coupling element further comprises a second jaw movable in rotation about a second axis of rotation perpendicular to and offset from the longitudinal axis, between:
- a clamping position wherein the second jaw presses the hose against the front part of the cannula in a zone comprised that extends in a radial direction relative to the longitudinal axis between the longitudinal axis and the second axis of rotation, and is bounded along the longitudinal axis by a boundary plane that is perpendicular to the longitudinal axis and spaced from the first axis of rotation by a second, non-zero distance that is measured parallel to the longitudinal axis, and
- a retracted position wherein the second jaw does not press the hose against the front part of the cannula;
the pusher comprising a second bearing surface, bearing against the second jaw;

the second bearing surface of the pusher is configured to exert on the second jaw a force for moving the second jaw from the retracted position thereof to the clamping position thereof;

the second bearing surface is arranged opposite the second axis of rotation in relation to the longitudinal axis; and when the second jaw is in the clamping position thereof, with the second bearing surface against the second jaw, a second radial gap, measured perpendicular to the longitudinal axis, between the first axis of rotation and a contact point of a force-receiving surface of the second jaw and the second bearing surface has a value greater than the value of the second distance.

7. The coupling element according to claim 6, wherein a ratio between the value of the second radial gap and the value of the second distance is comprised between 1.5 and 10.

8. The coupling element according to claim 7, wherein the ratio between the value of the second radial gap and the value of the second distance is comprised between 4 and 6.

9. The coupling element according to claim 8, wherein the ratio between the value of the second radial gap and the value of the second distance is equal to 5.

10. The coupling element according to claim 6, wherein the values of the first and second distances are equal and wherein the values of the first and second radial gaps are equal.

11. The coupling element according to claim 6, wherein the pusher comprises a relief configured to exert on the second jaw a force for moving the second jaw from the clamping position thereof to the retracted position thereof.

12. The coupling element according to claim 1, wherein the maneuvering member of the first jaw is a lever secured to the first jaw.

13. The coupling element according to claim 1, wherein the maneuvering member of the first jaw is a ring which is axially movable, along the longitudinal axis, relative to the body.

14. A manufacturing method for a coupling element according to claim 1, wherein:
the body is provided with at least one inner radial guiding surface;
the pusher is provided with at least one outer radial guiding surface configured to engage the inner radial guiding surface to guide the pusher during movements thereof along the longitudinal axis;
the pusher is movable, inside the passage of the body, to a reference position, wherein at least one outer radial guiding surface of the pusher is disengaged from any inner radial guiding surface of the body and vice versa; and
the method comprises a step consisting of:
a) making simultaneously, by additive manufacturing, the body and the pusher, while the pusher is in the reference position thereof.

15. The method according to claim 14 for manufacturing a coupling element where:
the first coupling element further comprises a second jaw movable in rotation about a second axis of rotation perpendicular to and offset from the longitudinal axis, between
a. a clamping position wherein the second jaw presses the hose against the front part of the cannula in a zone that extends in a radial direction relative to the longitudinal axis between the longitudinal axis and the second axis of rotation, and is bounded along the longitudinal axis by a boundary plane that is perpendicular to the longitudinal axis and spaced from the first axis of rotation by a second, non-zero distance that is measured parallel to the longitudinal axis;

b. a retracted position wherein the second jaw does not press the hose against the front part of the cannula;

the pusher comprising a second bearing surface, bearing against the second jaw;

the second bearing surface of the pusher is configured to exert on the second jaw a force for moving the second jaw from the retracted position thereof to the clamping position thereof;

the second bearing surface is arranged opposite the second axis of rotation in relation to the longitudinal axis; and when the second jaw is in the clamping position thereof, with the second bearing surface against the second jaw, a second radial gap, measured perpendicular to the longitudinal axis, between the first axis of rotation and a contact point of a force-receiving surface of the second jaw and the second bearing surface has a value greater than the value of the second distance;

wherein the method comprises successive steps subsequent to step a) and consisting in:

b) moving the pusher in the body of the coupling element to a position where the at least one outer radial guiding surface is engaged with the at least one inner radial guiding surface;

c) pre-positioning the two jaws in a housing;

d) engaging the housing equipped with the two jaws in the body through an opening provided in the body;

e) fitting and screwing screws in bearings of the housing and in tapped orifices of the two jaws, respectively, in such a way that the screws are aligned with the first axis of rotation and with the second axis of rotation;

f) mounting the member for elastically returning the pusher in the internal volume of the body, bearing against the pusher; and g) fitting the cannula inside the pusher and the body, bringing the elastic return member into abutment against the cannula.

* * * * *